(12) United States Patent
Blouin

(10) Patent No.: US 7,789,939 B2
(45) Date of Patent: Sep. 7, 2010

(54) ADSORBENT BED REPRESSURIZATION CONTROL METHOD

(75) Inventor: Stephane Blouin, Kenmore, NY (US)

(73) Assignee: Praxair Technology, Inc., Danbury, CT (US)

( * ) Notice: Subject to any disclaimer, the term of this patent is extended or adjusted under 35 U.S.C. 154(b) by 165 days.

(21) Appl. No.: 12/181,648

(22) Filed: Jul. 29, 2008

(65) Prior Publication Data

US 2010/0024640 A1 Feb. 4, 2010

(51) Int. Cl.
*B01D 53/04* (2006.01)
*G05B 13/00* (2006.01)
(52) U.S. Cl. .............................. 95/23; 95/96
(58) Field of Classification Search ............ 96/109, 96/110, 115, 116, 121; 95/1, 23, 90, 96, 95/97, 148
See application file for complete search history.

(56) References Cited

U.S. PATENT DOCUMENTS

| | | | |
|---|---|---|---|
| 4,197,096 A | | 4/1980 | Sebastian et al. |
| 4,725,293 A | | 2/1988 | Gunderson |
| 4,867,766 A | * | 9/1989 | Campbell et al. ............. 96/110 |
| 5,406,800 A | | 4/1995 | Bonaquist |
| 5,560,763 A | | 10/1996 | Kumar |
| 5,989,313 A | | 11/1999 | Mize |
| 6,073,463 A | | 6/2000 | Espie |
| 6,238,458 B1 | * | 5/2001 | Monereau ........................ 95/19 |
| 6,428,607 B1 | * | 8/2002 | Xu et al. ......................... 95/101 |
| 6,579,346 B1 | * | 6/2003 | Esselink ......................... 95/98 |
| 6,599,347 B2 | | 7/2003 | Kalbassi et al. |
| 2002/0139246 A1 | | 10/2002 | Kumar et al. |

FOREIGN PATENT DOCUMENTS

| | | |
|---|---|---|
| EP | 0992275 | 4/2000 |
| JP | 5084418 | 4/1993 |
| WO | WO2006/091723 A2 | 8/2006 |

* cited by examiner

*Primary Examiner*—Frank M Lawrence
(74) *Attorney, Agent, or Firm*—David M. Rosenblum

(57) ABSTRACT

A method for controlling an adsorption unit and associated compressor that adjusts the flow rate of a compressed feed stream produced by the compressor so that it increases from a nominal flow rate and then decreased back to the nominal flow rate. The increase and decrease of the feed stream flow rate are controlled in accordance with increase and decrease rate functions of adsorbent bed pressure ratio between off-line and on-line adsorbent beds and a triggering pressure ratio at which the feed flow rate decreases. Each of the increase and decrease rate functions is tuned to produce a similar response in the flow of a product stream produced by the adsorption unit. Additionally, repressurization time is controlled by driving it toward a target value that allows the purge stage of regeneration to be maximized and therefore, the degree to which each of the adsorbent beds is regenerated.

11 Claims, 3 Drawing Sheets

ADSORBENT BED REPRESSURIZATION CONTROL METHOD

FIELD OF THE INVENTION

The present invention relates to a method of controlling repressurization of an adsorbent bed of an adsorption unit in which the regeneration of the adsorbent beds during the repressurization is optimized by controlling the feed flow rate of a compressed feed stream that is compressed within a compressor such that fluctuations within the flow rate of the product streams are minimized and similar for each of the adsorbent beds and repressurization is controlled to drive repressurization times for the adsorbent beds toward a target repressurization time.

BACKGROUND OF THE INVENTION

Adsorbent units are utilized to adsorb one or more components that are contained in a feed stream to produce a product stream. The adsorption is carried out in adsorbent beds that are operated in and out of phase cycle such that while one bed is on-line and adsorbing component or components of the feed stream, another off-line bed is being regenerated. There are a variety of cycles that are employed in such adsorbent units, for example, pressure swing adsorption, temperature swing adsorption and vacuum pressure swing adsorption.

In a pressure swing adsorption cycle, the off-line bed being regenerated is subjected to a blow down phase of the regeneration in which the bed is depressurized. Thereafter, the bed is purged with a stream that has a sufficiently low concentration of the component or components to be adsorbed that the adsorbed component or components will desorb and be carried off the bed in the purge stream. This is known as the purge phase of the cycle. After the purge phase of the cycle is complete, the bed is brought back up to pressure with either part of the feed stream or part of the product stream. This phase is known as repressurization. Other cycles such as temperature swing adsorption and vacuum pressure swing adsorption require repressurization of the off-line bed to bring it back to operational pressure.

During repressurization, either part of the product stream or part of the feed stream is introduced into the off-line bed. In this regard, a repressurization valve is opened sending part of the compressed feed stream or the product stream into the off-line bed. Such a valve is a flow control valve that is controlled by a flow controller so that the flow rate of the product stream is maintained within a target range. As can be appreciated, the flow rate of the product stream will nevertheless vary.

This fluctuation can have an affect on downstream process equipment in which the product stream is utilized. For example, pressure and temperature swing adsorption systems are used in connection with cryogenic air separation plants. Since cryogenic air separation plants operate at a low temperature, it is necessary to remove higher boiling contaminants within the air, for example, carbon dioxide, water vapor and hydrocarbons. Such contaminants could freeze or in case of hydrocarbons, could reach dangerous concentrations within oxygen products. In order to counteract this problem, known adsorbents contained within adsorbent beds are utilized to purify a feed air stream from such contaminants. However, the fluctuation of flow rate in the product stream, which in case of a cryogenic air separation plant is the compressed and purified air stream, will affect product purities and product recoveries that have been found to fluctuate in accordance with the flow fluctuation in the compressed and purified air stream. In order to minimize such fluctuations, control schemes have been devised in which the fluctuation of the product stream flow rate is minimized by increasing the flow rate of the compressed feed stream fed from a compressor to the adsorption unit to counteract either the feed stream or the product stream being drawn off for repressurization purposes.

In one type of control scheme employed in the prior art, the compressed feed stream flow rate is increased and then decreased at fixed rates of increase and decrease. The increase and decrease is brought about by increasing and decreasing the inlet guide vane opening within the compressor feeding compressed air to the adsorption unit. The operating principle here is that as the repressurization valve is initially opened, there exists a high pressure difference between the off-line and the on-line bed. As the pressures approach equalization less driving force is available. At a pre-defined off-line to on-line triggering pressure ratio, that can be as high as 80 percent, the off-line adsorbent bed is nearly repressurized and therefore, the flow rate can be decreased rapidly. This, however, has been found to lead to a repressurization performance that varies due to inherent variability of ambient air pressure, temperature conditions, contaminant concentration in the air, bed performance, valve wear and air compressor performance variation due to cooling water temperature change.

In a specific control scheme designed to remove the effects of external factors, such as those outlined above, the bed pressures between an off-line bed and an online bed are measured and a pressure ratio is computed. This pressure ratio is continually compared to a preset triggering pressure ratio. The inlet guide vanes of the main air compressor are then manipulated so that flow rate of the feed stream increases until the triggering pressure ratio is reached and then decreases back to the nominal flow rate. The control program governing the operation of a controller used in controlling the inlet guide vanes utilizes an increase rate function that is a function of the bed pressure ratio and the triggering pressure ratio to eliminate the effect of the external factors. Additionally such increase rate function is designed so that the rate of increase of the opening of the inlet guide vanes will decrease as the triggering pressure ratio is approached. The purposes of such operation is to eliminate inertial effects of the compressor wheel that will inhibit the increasing flow rate from being decreased after the triggering pressure ratio is reached and also to minimally vary the flow rate of the compressed feed stream as required to repressurize the off-line bed. After the increase, the opening of the inlet guide vanes is decreased in accordance with a fixed rate until the nominal flow rate is reached. The problem remaining in such type of control is that the decrease is still effected by external factors and inertial effects can produce an overshoot as the flow rate of the compressed air stream is returned to the nominal flow rate.

An additional problem with the control scheme discussed above is that the response of product flow rate is not equal with respect to each of the beds and therefore, depending upon the bed, there will be more or less disturbance in the product flow rate. A related issue concerns the need to reduce the repressurization time. A reduction of the time spent in repressurizing an adsorbent bed will help prolong the purge phase time and will in turn extend the adsorption time because a longer purge time will result in a cleaner adsorbent bed. Extending the adsorption time will thereby reduce the frequency of bed switches and resulting valve wear and disturbances in product stream flow that are propagated to downstream equipment utilizing the product of the adsorption. Put another way, decreasing the repressurization time will allow for an increase of the bed cycle time. Increasing the bed cycle time is important in case of an air separation plant to eliminate the number of times adsorbent beds are switched from on-line and off-line status. However, reductions in the repressurization time usually lead to amplified air flow and/or pressure disturbances reaching downstream equipment that may be particularly sensitive to the same, for example, air separation units. The reason for this is the large number of separate items of equipment involved, for example, two or more adsorbent beds, valves and air compressor and etc. Moreover, the repressurization time cannot be reduced to a value that will produce fluidization of the adsorbent within the adsorbent beds.

It is to be noted that adsorbent bed cycle time is routinely adjusted in the prior art for maintaining the purity of the product stream. For instance, if the purity of the product stream decreases, the bed cycle time can be decreased and vice-versa. However, since in prior art control schemes, such as discussed above, repressurization time is not controlled, the adsorbent beds will not be equally regenerated because the time spent in purging the adsorbent beds will vary. As a result, the ability to extend bed cycle times will be limited by the adsorbent bed that has been least regenerated. As can be appreciated, the least regenerated adsorbent bed will not be able to remain in an on-line mode of operation adsorbing the impurities within the feed as long as a bed that has been more regenerated because the least regenerated adsorbent bed contains more impurities after regeneration.

As will be discussed, among other advantages, the present invention allows control to be exerted over the repressurization of adsorbent beds such that product flow rate disturbances are minimized and adsorbent bed repressurization times are driven towards a target to minimize repressurization times and to allow the operation of the adsorption unit to be optimized.

SUMMARY OF THE INVENTION

The present invention provides a method of controlling repressurization of adsorbent beds within an adsorption unit. In accordance with such method, one of the adsorbent beds is repressurized while off-line with a repressurization stream during regeneration of the one of the adsorbent beds such that the one of the adsorbent beds is brought back to an operational pressure and is ready to be brought back to an on-line status. The product stream flow rate of a product stream produced by the adsorption unit is measured and the flow rate of the repressurization stream is controlled such that the product stream flow rate remains within a target range.

During the repressurization of the one of the adsorbent beds, a compressor that feeds a compressed feed stream to the adsorption unit is controlled such that a feed flow rate of the compressed feed stream will increase from a nominal flow rate until a ratio of adsorbent bed pressures of the one of adsorbent beds in the off-line status and another of the adsorbent beds in the on-line status reaches a triggering pressure ratio and then will return back to the nominal flow rate after the triggering pressure ratio is reached over a target decrease time period. In this regard, the term "nominal flow rate" as used herein and in the claims means the flow rate of the compressed feed stream prior to the repressurization phase and directly after the repressurization phase. The feed flow rate is controlled with respect to each of the adsorbent beds in accordance with an increase rate function and a decrease rate function.

The increase rate function and the decrease rate function for each of the adsorbent beds is tuned such that the maximum deviation in the response of the product flow rate from the nominal flow rate during repressurization of each of the adsorbent beds is minimized and driven towards a value that is the same for all of the adsorbent beds. Additionally, the increase function is adjusted for each of the adsorbent beds during operation of the adsorption unit such that repressurization times for each of the adsorbent beds are driven toward a target repressurization time.

Varying fluctuations in the flow rate of the product stream produced by varying bed performance are minimized as a result of such control, since the maximum deviation of the product stream flow rate from the nominal flow rate during repressurization is minimized and driven towards a value that is the same for all of the adsorbent beds. Moreover, since the repressurization time can be driven toward a target, such target can be selected to minimize the repressurization time without creating large swings of variable magnitude in the flow rate of the product stream such as have been discussed above. At the same time, since the repressurization times are driven towards a target, the purge times will also be driven towards time periods that are similar for all of the adsorbent beds. The advantage of this is that the beds will be more equally regenerated resulting in the ability to extend bed cycle times. This being said, the ability to extend bed cycle times should not be taken as a limitation in that in applications of the present invention that are different from air separation, feed stream composition can rapidly vary and there exists the need to control purity by varying bed cycle times in a more rapid manner than encountered in air separation. For such applications of the present invention, an advantage of controlling the bed repressurization time allows the purity of the product to be more rapidly controlled by varying bed cycle times.

Preferably, the increase rate function and the decrease rate function are in turn functions of the adsorbent bed pressure ratio and the triggering bed pressure ratio such that the feed flow rate has a variable increase rate that decreases as the triggering pressure ratio is approached and a variable decrease rate that decreases as the adsorbent bed pressures approach one another.

The compressor can be controlled by a control parameter that influences the feed flow rate. This control parameter is continually adjusted at a control frequency and in accordance with the increase rate function and the decrease rate function for each of the adsorbent beds such that each adjustment in the control parameter results in a new value of the control parameter that is applied to the control of the compressor. The new value of the control parameter is determined by measuring the bed pressures, calculating the bed pressure ratio, comparing the pressure ratio to the triggering pressure ratio and calculating the new value of the control parameter.

The new value of the control parameter is determined by adding to a current value of the control parameter, an incremental increase, calculated in accordance with the increase rate function when the bed pressure ratio is below the triggering pressure ratio thereby to increase the feed flow rate at the variable increase rate. The new value of the control parameter determined by subtracting from the current value of the control parameter, an incremental decrease calculated in accordance with the decrease rate function after the bed pressure ratio has reached the triggering pressure ratio to return the flow rate of the compressed feed stream back to the nominal flow rate.

The increase rate function can be set equal to a product of an increase rate factor and a sum of 1.0 plus a first tuning factor times a difference of one-half the triggering pressure ratio and the bed pressure ratio. The decrease rate function can be set equal to a product of a decrease rate factor and a quantity equal to a difference between a second tuning factor multiplied by the bed pressure ratio and a third tuning factor. The second tuning factor in such case is equal to a difference of an initial value of the quantity at the triggering pressure ratio and a final value of the quantity at the nominal pressure ratio divided by a difference of the triggering pressure ratio and 1.0. The third tuning factor is equal to the first tuning factor less the final value of the quantity.

A running average of the repressurization time can be calculated at the control frequency for each of the adsorbent beds to produce an average repressurization time. A new increase rate factor is utilized as the increase rate factor and a new first tuning parameter is utilized as the first tuning factor if the average repressurization time is not equal to a target repressurization time. The new increase rate factor is directly proportional to a current value of the increase rate factor multiplied by the average repressurization time divided by the target repressurization time. The new first tuning parameter being directly proportional to a current value of the first tuning parameter multiplied by the average repressurization time divided by the target repressurization time. The increase rate function and the decrease rate function are tuned by selecting for each of the adsorbent beds values for the triggering pressure ratio, the decrease rate factor, the second tuning factor, the third tuning factor, the target decrease time period and initial values for the increase rate factor and the first tuning factor.

In any embodiment of the present invention, the control parameter can be an inlet guide vane position of inlet guide vanes of the compressor. The inlet guide vanes are positioned at successively greater openings to increase the feed flow rate and at successively lesser openings to decrease the feed flow rate. Moreover, the adsorption unit can operate in accordance with a pressure swing adsorption cycle and the repressurization stream can be part of the product stream. As a further point, in any embodiment of the present invention, repressurization of the one of the adsorbent beds can be controlled solely through the use of the repressurization valve if the control parameter is at a value that does not allow an increase in the feed flow rate. In such control, the repressurization of the one of the adsorbent beds is driven towards the target repressurization time.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
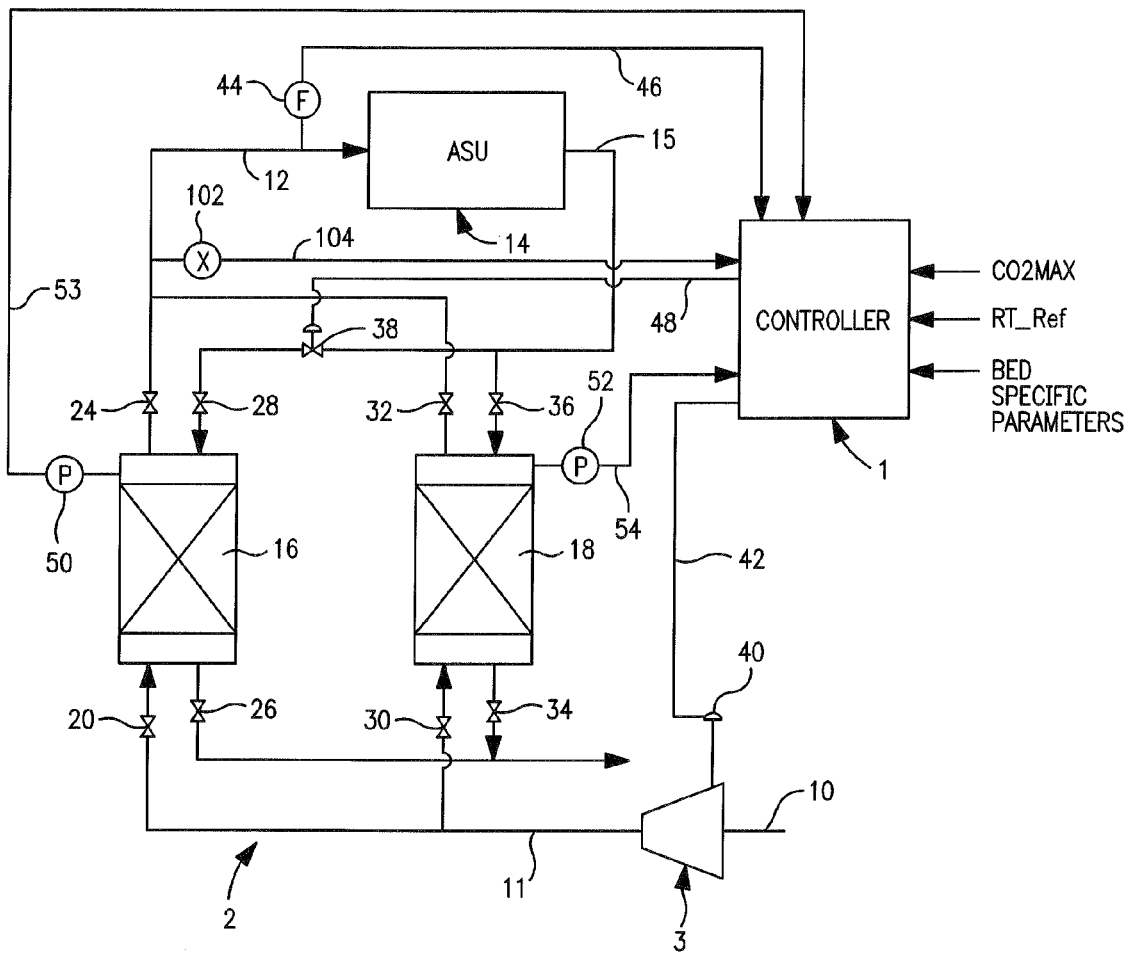
FIG. 1 is a schematic illustration of a pressure swing adsorption unit and associated compressor and a controller in accordance with the present invention.

With reference to FIG. 1 a controller 1 in accordance with the present invention is illustrated for use in connection with the control of a pressure swing adsorption unit 2 and its associated compressor 3. A feed stream 10 is compressed by compressor 3 to produce a compressed feed stream 11 that is fed into pressure swing adsorption unit 2 to produce a product stream 12 that is fed into an air separation unit cold box 14 ("ASU") as the main feed air.

It is understood that the use of the present invention in connection with air separation cold box 14 is for purposes of illustration only and is not intended to be limiting. This being said, as would be known by those skilled in the art, air separation unit cold box 14 would have one or more distillation columns for rectifying the air contained within feed stream 10 to produce a nitrogen product or possibly also, an oxygen product and an argon product. In this regard, the air separation unit cold box 14 is also provided with a main heat exchanger to cool the product stream 12 to a temperature suitable for its rectification within the one or more distillation columns.

In such a cold box 14, part of the product stream 12 can be further compressed, partially cooled within the main heat exchanger and then fed into a turboexpander to generate an exhaust stream used in imparting refrigeration to the air separation unit cold box. In case of a single column nitrogen generator, an oxygen-rich column bottoms can be partially vaporized in a head condenser used in generating reflux to the column and then expanded to generate an exhaust stream that is introduced into the main heat exchanger for imparting refrigeration. Such exhaust stream is discharged from the main heat exchanger as a waste nitrogen stream. In case of a double column unit having higher and lower pressure columns operatively associated with one another in a heat transfer relationship, a waste nitrogen stream used to control purity of a nitrogen product can be withdrawn from the lower pressure column and then fully warmed within the main heat exchanger. In either case, a purge stream 16 can be discharged from the air separation unit cold box 14 that can consist of the waste nitrogen stream formed in a manner set forth above. As well known in the art, other sources of purge stream 15 are possible.

The adsorption unit 2 in the illustrated embodiment is thereby purifying the feed stream 10 from higher boiling contaminants such as water vapor and carbon dioxide and also possibly carbon monoxide by passage of the feed stream 10 into adsorbent beds 16 and 18. The adsorption unit 2 operates in accordance with a pressure swing adsorption cycle. Again, it is understood that this is only for purposes of illustration and the invention would have application to other cycles such as temperature swing adsorption or vacuum pressure swing adsorption. Moreover, such adsorption units can employ more than two beds.

In adsorption unit 2, adsorbent beds 16 and 18 are subjected to an out of phase cycle wherein while adsorbent bed 16 is on-line and adsorbing impurities, adsorbent bed 18 is off-line and being regenerated and vice-versa. After regeneration of adsorbent bed 18, adsorbent bed 18 is brought back on-line and adsorbent bed 16 is regenerated.

Figure 2:
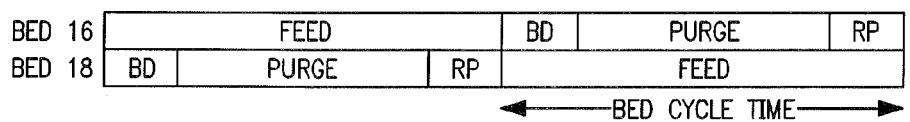
FIG. 2 is a graphical representation of the out of phase cycle to which the adsorbent beds of FIG. 1 are subjected.

With additional reference to FIG. 2, each of the adsorbent beds 16 and 18 are subjected to a "Feed" stage in the out of phase cycle in which the feed stream 10 after compression in compressor 3 as compressed feed stream 11 is introduced into one of the adsorbent beds 16 and 18 while the other of the adsorbent beds 16 and 18 are being regenerated. For example, during the "Feed" stage of adsorbent bed 16 valves 20 and 24 are set in open positions to produce product stream 12. During this time, adsorbent bed 18 is subjected to regeneration.

As a first stage of the regeneration, adsorbent bed 18 is subjected to a blow down phase ("BD"). During blow down, valves 26 and 28, associated with adsorbent bed 16 are set in closed positions and valves 30 and 32 associated with adsorbent bed 18 are set in closed positions. Additionally, valve 34 is set in an open position and valve 36 is set in a closed position. This allows adsorbent bed 18 to be depressurized to atmospheric pressure. Thereafter, adsorbent bed 18 is subject to a purge stage ("Purge") with purge stream 15 by setting valve 36 in an open position to cause the impurities to be purged from adsorbent bed 18.

After having been purged, adsorbent bed 18 is subjected to a repressurization stage ("RP"). During this time, valve 36 and 34 are each set in a closed position while valve 32 is set in an open position and valve 30 is set in a closed position. Additionally, repressurization valve 38 is opened to allow part of the product stream 12 to be used to bring adsorbent bed 18 back to operating pressure. It is understood, however, that repressurization with part of the compressed feed stream 11 is also possible. After repressurization is complete, adsorbent bed 18 is brought back on line and adsorbent bed 16 is regenerated in the same manner through manipulation of valves 20, 24, 26 and 28. All of these phases and operation of pressure swing adsorption unit 2 are entirely conventional and as such, would be known by one skilled in the art.

Assuming the repressurization of the off-line adsorbent bed 18, repressurization valve 38 is progressively opened while valve 32 is set in the open position. As indicated above, this permits part of the product stream 12 to enter adsorbent bed 18 to repressurize adsorbent bed 18. As a result of the repressurization, the flow rate of product stream 12 would otherwise decrease but for the fact that the flow rate of feed stream 10 is increased. The flow rate of feed stream 10 is increased by opening up inlet guide vanes 40 associated with compressor 3. Inlet guide vanes are a known component of such compressors and are provided to adjust flow rate of compressed feed stream 11 produced by the compressor 3. Compressed feed stream 11 is alternately fed to adsorbent beds 16 and 18 and during regeneration of adsorbent bed 18, as indicated above, valve 20 is set in an open position and valve 30 is set in the closed position. The action of inlet guide vanes 40 is controlled by signal generated by controller 1 sent via a data transmission line 42.

The flow rate of product stream 12 is continually monitored by a flowmeter 44 that generates a signal referable to the flow rate of product stream 12. The signal from flowmeter 44 is introduced into a control program within controller 1 that reacts to adjust repressurization valve 38 to control flow rate of the repressurization stream so that flow rate of product stream 12 remains within a target flow range. In this regard, a data transmission line 46 is provided to transmit the signal from flowmeter 44 to controller 1. Known control methods for such purpose include proportional, integral and differential control systems.

It is to be noted that the control program, also in controller 1 in a manner well known in the art, is designed to control the sequencing of the illustrated valves 20, 24, 26, 28, 30, 32, 34 and 36. Controller 1 can be programmable logic controller that can be obtained from a variety of vendors, for example, an ALLEN-BRADLEY® controller that can be obtained from Rockwell Automation of Milwaukee, Wis. USA. Such controllers incorporate a control program that can be programmed for such purposes as have been discussed above, for example, control of bed sequencing and repressurization valve 38, and also, for carrying out various aspects of the present invention. It is also understood that certain adsorption units can be obtained from manufacturers with control systems. Typically, such control systems can be further programmed to carry out the present invention. It is possible that a separate controller could be provided that would incorporate logic of the present invention in order to feed control data to an existing controller.

Figure 3:
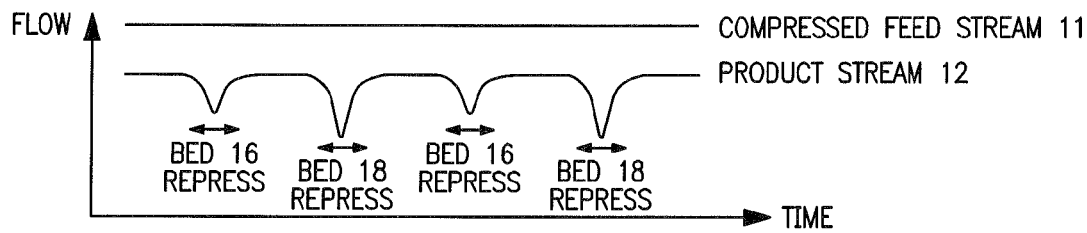
FIG. 3 is a graphical representation of the flow rate of the compressed feed stream and the response of the product stream without any control of the repressurization of an adsorbent bed.

With brief reference to FIG. 3, prior art illustrations of the flow rate of the product stream 12 and the flow rate of the compressed feed stream 11 are illustrated. In such prior art illustration, a pressure swing adsorption unit, such as that shown in FIG. 1, is operated so that the flow rate of the compressed feed stream 11 is held constant during repressurization. The repressurization valve 38 is, however, adjusted to repressurize the off-line bed. As illustrated, during each pressurization of either of the adsorbent beds 16 and 18, a decrease in the flow rate of product stream 12 occurs. As indicated above, this sharp decrease in flow rate can have a particularly deleterious effect on the operation of air separation plants.

Figure 4:
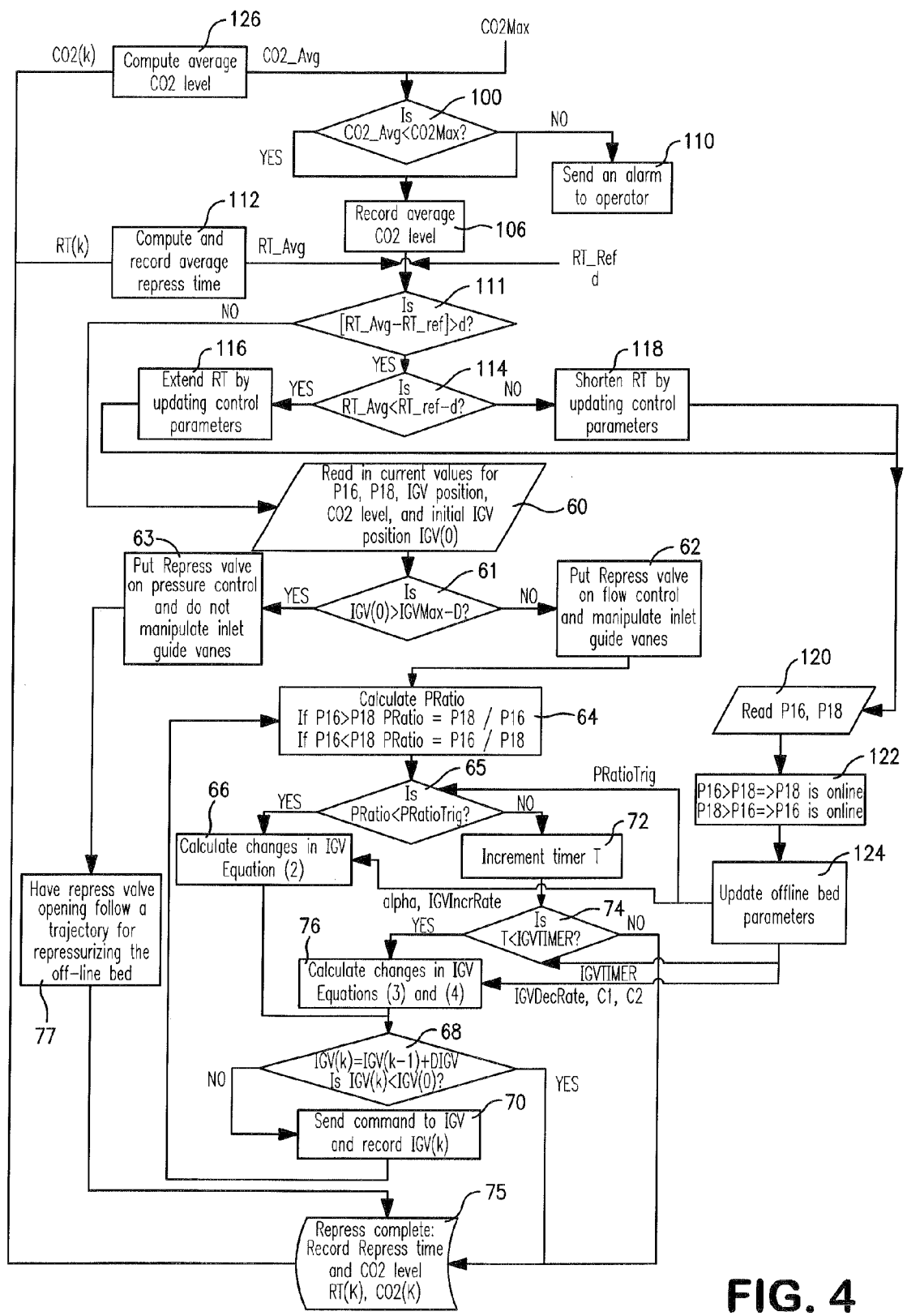
FIG. 4 is a logic flow diagram of a control scheme in accordance with the present invention to control repressurization of the adsorbent beds.

In order to counteract such a decrease in the flow rate of product stream 12 during repressurization, the position of the inlet guide vanes 40 can be adjusted to increase the flow rate of compressed feed stream 11. With reference to FIG. 4, the control logic of the present invention is illustrated in which the position of the inlet guide vanes is adjusted for such purposes during repressurization of an off-line adsorbent bed. The logic incorporates several features. One feature is to control the positioning of the inlet guide vanes through the use of increase and decrease rate functions that will both operate independently of external conditions such as have been discussed above. Moreover, both of such increase and decrease rate functions can operate to minimize the impact of inertial effects of the compressor wheel that can potentially produce overshooting during the transition of the increase in compressor flow rate to the decrease at the triggering pressure as in the prior art, but also, as the nominal flow rate of compressor air is to be regained after repressurization is complete. Another feature is that both the increase and decrease rate functions are tuned so that the response in the flow rate of the product stream 12 are substantially the same for each of the adsorbent beds 16 and 18. In yet another feature, each of the adsorbent beds is driven towards a target repressurization time during repressurization. A still further feature is that the logic alerts operational personnel so that bed cycle time during which adsorbent beds 16 and 18 are regenerated and are on-line can be adjusted. Although the embodiment discussed below utilizes control of inlet guide vanes 40, it is understood that the same concepts could be applied to a compressor in which the parameter of control is compressor speed of a variable speed compressor. Then, rather than calculating inlet guide vane differences, the same logic could be modified to calculate compressor speed differences.

The portion of control logic in which inlet guide vane adjustment is controlled independently of external conditions and with minimization of the impact of compressor inertial effects will first be discussed. It is to be noted that the program incorporating such control logic continually executes at a control frequency that executes significantly faster than the repressurization time and at a frequency in terms of a fraction of a second. Upon each execution of the program, current values of the bed pressures of adsorbent beds 16 and 18 are fed into controller 1 by way of pressure transducers 50 and 52 that are linked to controller 1 by data transmission lines 53 and 54, respectively. Additionally, the current position of the inlet guide vanes 40 of compressor 3 ("IGV(k)") are sent via data transmission line 42 to controller 1 and also read into the control program residing within controller 1. Further, at an initial execution of the control program an initial position of inlet guide vanes 40 ("IGV(0)") is also read into the program and for purposes to be discussed the carbon dioxide level. This stage of program execution is indicated in program execution stage 60.

Execution of the program then proceeds to program execution stage 61 in which the initial position of the inlet guide vanes 40 is tested against a maximum open position "IGV-Max" less a factor "D". Here the concern is that the inlet guide vanes 40 are near a maximum open position in which practically, the inlet guide vanes could not be sufficiently opened to effect an increase in the flow rate of compressed feed stream 11 to counteract the flow of the product or feed passing to the off-line adsorbent bed. This can occur during hot, humid conditions in which the inlet guide vanes 40 are near their maximum open position. As such, "D" is selected to represent the difference in the opening of the inlet guide vanes 40 that would have to occur to allow the flow rate of the compressed feed stream 11 to be increased to counteract flow to the off-line adsorbent bed. If the test is in the negative, the execution proceeds to stage 62 in which the repressurization valve 38 is set into a mode in which its action is controlled in response to the flow of the product stream 12. If the test is in the affirmative, then as indicated in 63 and as will be further discussed, the repressurization valve 38 is placed on pressure control, and the inlet guide vanes 40 are not manipulated.

Assuming that the test of stage 61 is in the negative, execution of the program then proceeds to program execution stage 64 in which the bed pressure ratio between adsorbent beds 16 and 18 are calculated. Assuming adsorbent bed 18 has just been subjected to the purge phase of regeneration, the bed pressure ratio is between the adsorbent bed pressures of adsorbent bed 18 and the adsorbent bed 16 because the bed pressure of adsorbent bed 16 is greater than that of adsorbent bed 18. When adsorbent bed 16 is undergoing regeneration the bed pressure ratio will be between the adsorbent bed pressure of adsorbent bed 16 and adsorbent bed 18 because adsorbent bed 16 has an adsorbent bed pressure less than that of adsorbent bed 18.

After the pressure ratio has been computed it is then tested against a triggering pressure ratio "PRatioTrig" as indicated in program execution stage 65. The triggering pressure ratio represents a preset value set within the control program associated with controller 1. If the pressure ratio is less than the triggering pressure ratio then a change in the inlet guide vanes is calculated as indicated in program execution stage 66 to increase the flow rate of compressed feed stream 11. The differential inlet guide vane movement "DIGV" is calculated from an increase rate function that is given by the following equation:

$$DIGV = \text{Increase rate factor } (1+\text{alpha}*(0.5*PRatioTrig-Pratio))$$

"alpha" is a first tuning factor; "PRatioTrig" is the triggering pressure ratio and "Pratio" is the pressure ratio of adsorbent bed pressures between the off-line adsorbent bed and the on-line adsorbent bed. As is apparent, as the pressure within the off-line bed increases, "DIGV" will first increase during each execution of the control program and then decrease during subsequent executions until the triggering pressure ratio is reached. As such, the increase of the flow rate of compressed feed stream 11 will be variable.

As indicated in program execution stage 68, the change of differential inlet guide vane movement "DIVG" or in other words, an incremental movement of the inlet guide vanes 40, that calculated in program execution stage 66, is added to the current position of the inlet guide vanes "IGV(k−1)" to determine a new inlet guide vane position "IGV(k)". The new position of inlet guide vanes 40 is then tested against the initial position thereof previously read into the control program. During the increase in flow rate, the new inlet guide vane position will always be greater than the initial position and as such, as indicated in program execution stage 70, a command is sent by controller 1 to the inlet guide vanes 40 to open the inlet guide vanes to the new inlet guide vane position "IGV(k)" which is then recorded within the control program as the current position of the inlet guide vanes 40. At the next execution time the time stamp "k" is incremented by one and the last implemented inlet guide vanes opening value becomes "IGV(k−1)". After program execution stage 70, the program returns to program execution stage 64.

The inlet guide vanes 40 are opened until the bed pressure ratio is equal to the triggering pressure ratio. At such point, the test in program execution stage 65 is in the negative and inlet guide vanes 40 are controlled so that they close and return the flow rate of the compressed feed stream 11 to a nominal level that existed before the inlet guide vanes 40 were opened. This is done over a fixed time period in which a timer is incremented as indicated in program execution stage 72 to obtain a current time "T". As indicated in program execution stage 74, the current time "T" is then tested against a preprogrammed time "IGVTIMER" that is a time constraint at which the flow rate of the compressed feed stream 11 should return to the nominal flow rate. Assuming that the time "T" is less than "IGVTIMER", a decrease in the opening of inlet guide vane 40 is computed as indicated in program execution stage 76. If, however, the time "T" is equal or greater than "IGVTIMER", the programming logic proceeds to program execution stage 75 as repressurization is complete.

It is to be noted that prior art control schemes have been used in which the inlet guide vanes are opened until the triggering pressure ratio is reached as described above and then decreased over a fixed time period. In such control systems, the function of decrease was simply at a constant rate of decrease. However, in the present invention, the inlet guide vanes 40 are returned back to a position in which a nominal flow rate of compressed feed stream 11 is again obtained, a differential decrease rate ("DIGV") is calculated in program execution stage 76. "DIGV" in program execution stage 76 is calculated in accordance with a decrease rate function that is given by the following equation:

$$DIGV = \text{Decrease Rate Factor } (C1*Pratio-C2)$$

In the above two equations the values for the "Increase Rate Factor", the "Decrease Rate Factor" and the C1 and C2 tuning factors should be selected all together so that the feed stream flow rate manipulations as described above generate a gas volume at least equivalent to the empty volume of the off-line absorbent bed. As is apparent, as the bed pressure ratio increases or in other words, repressurization is approaching completion, each incremental closure of the inlet guide vanes 40 could be made greater or smaller through the choice of tuning factors C1 and C2. Preferably, each closure can be made smaller when approaching completion to prevent overshooting at the end of the repressurization cycle. The fact that the rate of decrease is also a function of "PRatio" makes it vary as a result of changes in off-line bed or feed stream conditions. As such the rate of decrease in the flow rate of compressed feed stream 11 will also be variable. C1 in the equation is set equal to a difference between a desired initial value and the final value of the quantity "C1*Pratio−C2" divided by a difference of the triggering pressure ratio and 1.0. C2 is equal to the difference between C1 and the final desired value of the quantity "C1*Pratio−C2". The initial and final values of such quantity are selected based on how fast the inlet guide vanes 40 can be manipulated while maintaining safe compressor operations of compressor 3.

After the differential decrease has been computed, execution of the control program proceeds to program execution stage 68 and as a negative value, the differential decrease is added to the current position of the inlet guide vanes 40 "IGV(k−1)" to produce a new position of the inlet guide vanes "IGV(k)". Assuming that the new calculated position "IGV(k)" is greater than the initial position of the inlet guide vanes at the start of repressurization, "IGV(0)", the control program proceeds to program execution stage 70. As such stage, a command is sent to the inlet guide vanes 40 and the current new position of the inlet guide vanes 40 is recorded as "IGV(k)" and the program execution returns to program execution stage 64. If, however, the calculated new position of the inlet guide vanes 40 is less than the initial position of the inlet guide vanes 40, then repressurization is complete and execution proceeds to program execution stage 75 and re-executes at the controller frequency.

Turning back to program execution stage 63, in which repressurization of the adsorbent beds 16 and 18 is to be controlled by the repressurization valve 38 and not the inlet guide vanes 40, execution of the program proceeds to program execution stage 77 in which the repressurization valve 38 follows a trajectory for repressurizing the off-line adsorbent bed, 16 or 18. Although not illustrated, this logic incorporates a timer that is initially set to "0". A target repressurization rate is then calculated by subtracting the pressure of the off-line adsorbent bed from the on-line adsorbent bed and dividing the same by a target repressurization time.

The repressurization valve 38 is then cracked open to a small percentile opening and then at a control frequency, that can be one second, the actual bed differential pressure is calculated by subtracting the off-line bed pressure from the on-line bed pressure. Also, an expected bed differential pressure is calculated by subtracting from the pressure of the on-line adsorbent bed, a quantity equal to the target pressurization rate and the current value of the timer. From this an off-set pressure is calculated that is the difference between the actual bed differential pressure and the expected bed differential pressure. A change in the repressurization valve opening as a percentile opening is then computed by adding to a fourth tuning factor a product of the off-set pressure and a fifth tuning factor. The new valve opening, again as a percentile, will be a sum of the current opening percentile of the repressurization valve 38 and the change in the repressurization valve opening of repressurization valve 38. It is to be noted that control logic also exists as known in the art to translate the percentile opening into valve movement of the repressurization valve 38.

As is apparent from the above description, if the pressure of either of the off-line of the adsorbent beds 16 and 18 is below their target, then the off-set pressure will be greater than zero, causing an increase to enable the pressure of the off-line bed to catch up to its target value and vice-versa. As such repressurization is controlled such that the off-line adsorbent bed is driven towards the target repressurization time that can be the same time that can be set, as will be discussed below, to modify tuning factors of the increase rate function. It is to be noted, that the fourth and fifth tuning factors are selected all together so that repressurization can be completed within the target time.

Figure 5:
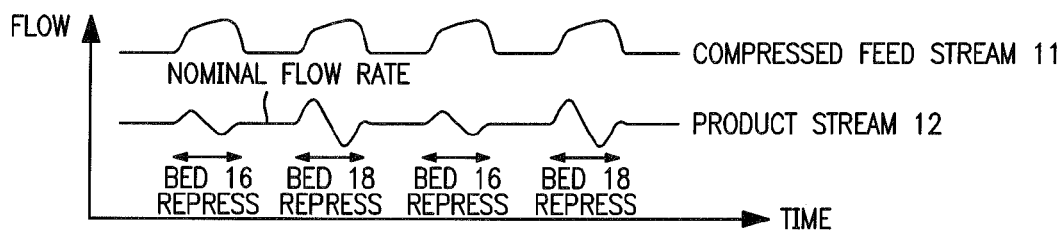
FIG. 5 is a graphical representation of the flow rate of the compressed feed stream and the response of the product stream during repressurization that is expected with a control scheme without tuning.

However, if program execution stage 62 is reached and the repressurization is to be controlled by the inlet guide vanes 40, since both the increase rate and the decrease rate for the opening of inlet guide vanes 40 is computed in accordance with functions of the bed pressure ratio and the triggering pressure ratio, the effects of density of the feed stream 10 and other environmental factors will not effect the repressurization of the adsorbent beds 16 and 18. However, if the increase rate factor, Alpha, the Decrease Rate factor, C1 and C2 and the constrained time period for the decrease in the inlet guide vane positioning "IGVTIMER" are uniformly applied to all of the adsorbent beds 16 and 18, as indicated in FIG. 5, the deviation in flow rate of the product stream 12 from the nominal flow rate of product stream 12 that existed prior to repressurization varies from bed to bed. As shown in FIG. 5, the fluctuation in flow rate of adsorbent bed 18 is greater than adsorbent bed 16. In other words, as measured from the peaks of the curve during each repressurization of adsorbent bed 18, the maximum deviation from the nominal is greater than that of adsorbent bed 16. Given the difference in the curves, the repressurization time is more likely to vary from bed to bed making it difficult to extend bed cycle times for reasons outlined above. As discussed above, the control logic of the present invention, in one aspect thereof, allows the increase and decrease rate functions, set forth above, or even more simplified constant functions, to be tuned such that the deviations in the flow rate of product stream 12 from the nominal flow rate are attempted to be minimized and driven towards a value that is the same for all of the adsorbent beds. In this regard, although the increase rate function and the decrease rate function are set forth herein as specific functions of increase rate factor, decrease rate factor and tuning factors, it is understood that other functions could be used to the same effect, but perhaps with slightly different responses. For example, the present invention is applicable to simplified functions in which the increase rate function is given as DIGV=IncreaseRateFactor and a decrease rate function is set forth as DIGV=DecreaseRateFactor. The disadvantages of such functions is that they would not incorporate an operation that was independent of external factors. However, not only can such functions be tuned, but as will be discussed, a target repressurization time could be imposed on even such simplified functions.

As illustrated, the control logic of the present invention can be employed in connection with the adjustment of bed cycle time in response to deviations of impurity concentration that are beyond a maximum allowable limit. It is understood, however, that the present invention also has application to embodiments in which the repressurization time is controlled towards a target for purposes of maximizing the purge phase and therefore the degree to which all of the adsorbent beds are regenerated.

In yet another aspect discussed above, the control logic of the present invention allows control of the bed cycle time. To such end, a maximum allowable carbon dioxide concentration "CO2Max", as a pre-set, is introduced into program execution stage 100 and the computed average carbon dioxide level within product stream 12 is tested. With brief reference to FIG. 1, the current value of the carbon dioxide concentration "CO2(K)" is obtained from a gas analyzer 102 and is fed by data transmission line 104 into controller 1 and utilized in later program logic stages to determine the average carbon dioxide level. Although not illustrated, this data can be retrieved by an operator so that the operator is able to inspect the data for trends that would indicate that the carbon dioxide concentration is tending toward "CO2Max" and the same is recorded in program execution stage 106. Furthermore, an operator is able to retrieve the current value of the carbon dioxide concentration within product stream 12 at any instant. If the test is in the negative, an alarm is sent to the operator as indicated in program execution stage 110. As can well be appreciated by those skilled in the art, it is possible to automate the calculation of new bed cycle times and values for target repressurization times and thereby to automate the application of new bed cycle times and new target repressurization times.

In any case after multiple executions of the program, preferably in terms of multiple repressurization cycles over a period of at least one day, if the average carbon dioxide concentration is seen by the operator to be less than the maximum allowable concentration, the operator can elect to decrease a target repressurization time "RT_Ref" and/or increase the bed cycle time for reasons that have been discussed above. If, however, the average carbon dioxide concentration is greater than or equal to the maximum allowable carbon dioxide concentration, then, the operator can also elect to reduce the target repressurization time. However, as discussed above there are limitations on the extent of reduction of such time period and if necessary to reduce the average carbon dioxide concentration further, the bed cycle time can be reduced.

The target repressurization time "RT_Ref" can be set by the operator into the program execution stage 111. Additionally, at such time, the computed average repressurization time "RT_Avg" determined in program execution stage 112 to be discussed is also introduced into program execution stage 111. In stage 111, the average repressurization time is then compared to a target repressurization time "RT_ref" by subtracting the target repressurization time from the average repressurization time and then testing the absolute value of the difference against a quantity "d" that represents an allowable deviation in the target repressurization time. If this test is in the negative, then the repressurization time "RT" does not have to be adjusted and execution proceeds to program execution stage 60. If this test is in the affirmative, the repressurization time "RT" has to be adjusted and as indicated in program execution stage 114, the actual value is tested as opposed to the absolute value. If the test is in the positive, the actual repressurization time to be applied to an adsorbent bed is extended as indicated in program execution stage 116 by updating control parameters. If this test is in the negative, then such actual repressurization time is reduced as indicated in program execution stage 118.

The logic then simultaneously proceeds to program execution stage 120 and program execution stage 122. In program execution stage 120, the adsorbent bed pressures "P16" and "P18" are read and then tested as shown in program execution stage 122 to determine the off-line bed. Depending on the off-line bed, the increase rate function and the decrease rate function are tuned by being updated with bed specific parameters within the off-line adsorbent bed as indicated in program execution stage 124 to minimize the deviation of the flow rate of the product stream 12 from the nominal flow rate and to make certain such deviation is the same for each of the adsorbent beds 16 and 18 during the pressure thereof. For example, the target deviation can be about five percent of the nominal flow rate or less. At this time a triggering pressure ratio, is fed into program execution stage 65, calculated values for "alpha", the first tuning factor and the increase rate factor are fed into program execution stage 66 for use in the increase rate function, a decrease time period "IGVTIMER" is fed into program execution stage 74, and a decrease rate factor and the second and third tuning factors C1 and C2 are fed into program execution stage 76 for use in the decrease rate function. In terms of bed tuning, the bed specific parameters are the triggering pressure ratio, initial values of "alpha" and the increase rate factor, the decrease time period "IGVTIMER", a decrease rate factor and the second and third tuning factors C1 and C2. These values are specific for each of the adsorbent beds 16 and 18. Each of these values is determined as described above and are refined during operation of adsorbent unit 2 by downloading and analyzing data related to the flow rate of the product stream 12.

Turning next to that aspect of the logic relating to repressurization time, since, the decrease time period "IGVTIMER" is fixed for each of the adsorbent beds and represents a particular brief time interval, the adsorbent beds 16 and 18 can be driven toward the target repressurization time "RT_ref" by adjusting the increase rate function and particularly, the increase rate factor and the first tuning factor "alpha". During each execution, a new increase rate factor is calculated by multiplying the current increase rate factor by a ratio of the current average repressurization time "RT_Avg" and the target repressurization time "RT_Ref" and optionally, a damping factor to control the aggressiveness of the response. Additionally, the first tuning factor "alpha" is multiplied by the same ratio and optionally, a damping factor specifically selected for this variable. If the average repressurization time is greater than the target repressurization time, then the increase rate factor and "alpha" will be computed to result in an increase of such variable to in turn result in a faster repressurization time to drive the repressurization time toward the target repressurization time. When the average repressurization time is less than the target repressurization time, then the increase rate factor and "alpha" will be reduced to increase the repressurization time to drive the repressurization time towards the target repressurization time. These calculations are performed in program execution stages 116 and 118 depending upon the outcome of the test in stage 114. During each execution of the control program implementing the logic shown in FIG. 4, such new values for the increase rate factor and "alpha" are used in the increase rate function calculations of program execution stage 66.

After the new calculation for the increase rate factor and the decrease rate factor, program execution stage 75 is reached in which the repressurization time is recorded along with the carbon dioxide level as "RT(k)" and "CO2(K)". These two parameters are fed beck into program execution stage 112 to compute the average repression time "RT_Avg" and into program execution stage 126 to compute the average carbon dioxide level that are used in the manner set forth above.

Figure 6:
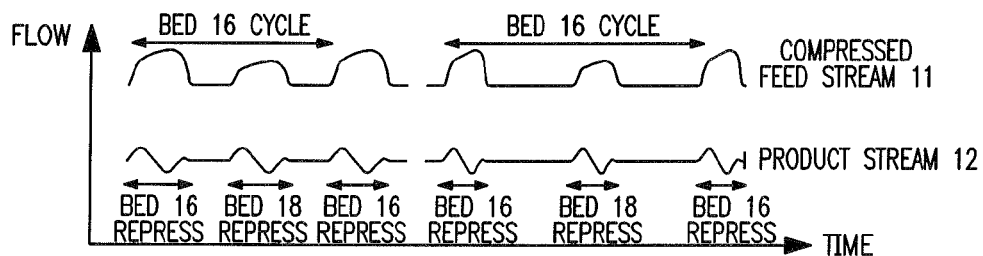
FIG. 6 is a graphical representation of the flow rate of the compressed feed stream and the response of the product stream during repressurization that is accomplished with the control scheme shown in FIG. 4.

With reference to FIG. 6, the variation between flow rate of the product stream 12 in the first three repressurizations starting from the left of the Figure are apparent in that for each of the adsorbent beds 16 and 18, the maximum deviation in the flow rate from the nominal flow rate of the product stream 12 are the same for each of the beds with the repressurization time driven toward a target. As to the next three repressurizations of adsorbent beds 16 and 18, it can be seen that the repressurization time is driven towards a smaller target value. Additionally, the adsorbent bed cycle time has been increased in the last three repressurizations. As indicated above, the operator may have taken such action in response to the average carbon dioxide level being less than the maximum allowable.

While the present invention has been described with reference to a preferred embodiment, as will occur to those skilled in the art, numerous changes, additions and omissions can be made without departing from the spirit and scope of the present invention as set forth in the presently pending claims.

What is claimed is:

1. A method of controlling repressurization of adsorbent beds within an adsorption unit comprising:
   repressurizing one of the adsorbent beds while off-line with a repressurization stream during regeneration of the one of the adsorbent beds such that the one of the adsorbent beds is brought back to an operational pressure and is ready to be brought back to an on-line status;

measuring product stream flow rate of a product stream produced by the adsorption unit and controlling the flow rate of the repressurization stream such that the product stream flow rate remains within a target range;

during the repressurization of the one of the adsorbent beds, controlling a compressor feeding a compressed feed stream to the adsorption unit such that a feed flow rate of the compressed feed stream will increase from a nominal flow rate until a ratio of adsorbent bed pressures of the one of adsorbent beds and another of the adsorbent beds in the on-line status reaches a triggering pressure ratio and then will return back to the nominal flow rate after the triggering pressure ratio is reached over a target decrease time period;

the feed flow rate being controlled with respect to each of the adsorbent beds in accordance with an increase rate function and a decrease rate function;

tuning the increase rate function and the decrease rate function for each of the adsorbent beds such that deviations in the response of the product flow from the nominal flow rate during repressurization of each of the adsorbent beds is minimized and driven towards a value that is the same for all of the adsorbent beds; and adjusting the increase function for each of the adsorbent beds during operation of the adsorption unit such that repressurization times for each of the adsorbent beds is driven toward a target repressurization time.

2. The method of claim 1, wherein the increase rate function and the decrease rate function are functions of the adsorbent bed pressure ratio and the triggering bed pressure ratio such that the feed flow rate has a variable increase rate that decreases as the triggering pressure ratio is approached and a variable decrease rate that decreases as the adsorbent bed pressures approach one another.

3. The method of claim 2, wherein:

the compressor is controlled by a control parameter that influences the feed flow rate;

the control parameter is continually adjusted at a control frequency and in accordance with the increase rate function and the decrease rate function for each of the adsorbent beds such that each adjustment in the control parameter results in a new value of the control parameter that is applied to the control of the compressor and is determined by measuring the bed pressures, calculating the bed pressure ratio, comparing the pressure ratio to the triggering pressure ratio and calculating the new value of the control parameter;

the new value of the control parameter determined by adding to a current value of the control parameter, an incremental increase calculated in accordance with the increase rate function when the bed pressure ratio is below the triggering pressure ratio thereby to increase the feed flow rate at the variable increase rate; and the new value of the control parameter determined by subtracting from the current value of the control parameter, an incremental decrease calculated in accordance with the decrease rate function after the bed pressure ratio has reached the triggering pressure ratio to return the flow rate of the compressed feed stream back to the nominal flow rate.

4. The method of claim 3, wherein:

the control parameter is inlet guide vane position of inlet guide vanes of the compressor; and the inlet guide vanes are positioned at successively greater openings to increase the feed flow rate and at successively lesser openings to decrease the feed flow rate.

5. The method of claim 3, wherein the adsorption unit operates in accordance with a pressure swing adsorption cycle.

6. The method of claim 3, wherein the repressurization stream is part of the product stream.

7. The method of claim 3, wherein repressurization of the one of the adsorbent beds is controlled solely through the use of the repressurization valve if the control parameter is at a value at the start of the repressurization that does not allow an increase in the flow rate of the compressed feed stream and such that the repressurization of the one of the adsorbent beds is driven towards the target repressurization time.

8. The method of claim 3, wherein:

the increase rate function is equal to a product of an increase rate factor and a sum of 1.0 plus a first tuning factor times a difference of one-half the triggering pressure ratio and the bed pressure ratio;

the decrease rate function is equal to a product of a decrease rate factor and a quantity equal to a difference between a second tuning factor multiplied by the bed pressure ratio and a third tuning factor;

the second tuning factor is equal to an initial value of the quantity at the triggering pressure ratio less a final value of the quantity at the nominal pressure divided by a difference of the triggering pressure ratio and 1.0;

the third tuning factor is equal to the first tuning factor less the final value of the quantity;

a running average of the repressurization time is calculated at the control frequency for each of the adsorbent beds to produce an average repressurization time;

a new increase rate factor is utilized as the increase rate factor and a new first tuning parameter is utilized as the first tuning factor if the average repressurization time is not within a predefined range of a target repressurization time;

the new increase rate factor being directly proportional to a current value of the increase rate factor multiplied by the average repressurization time divided by the target repressurization time; and the the new first tuning parameter being directly proportional to a current value of the first tuning parameter multiplied by the average repressurization time divided by the target repressurization time; and the increase rate function and the decrease rate function being tuned by selecting for each of the adsorbent beds values for the triggering pressure ratio, the decrease rate factor, the second tuning factor, the third tuning factor, the target decrease time period and initial values for the increase rate factor and the first tuning factor.

9. The method of claim 8, wherein:

the control parameter is inlet guide vane position of inlet guide vanes of the compressor; and the inlet guide vanes are positioned at successively greater openings to increase the feed flow rate and at successively lesser openings to decrease the feed flow rate.

10. The method of claim 9, wherein the adsorption unit operates in accordance with a pressure swing adsorption cycle.

11. The method of claim 10, wherein the repressurization stream is part of the product stream.

* * * * *